United States Patent [19]

Frommelt et al.

[11] 3,826,049

[45] July 30, 1974

[54] LOADING DOCK SHELTER WITH INDEPENDENTLY MOVABLE HEAD CURTAIN

[75] Inventors: Cyril P. Frommelt; Sylvan J. Frommelt, both of Dubuque, Iowa

[73] Assignee: Dubuque Awning & Tent Company, Dubuque, Iowa

[22] Filed: Feb. 7, 1973

[21] Appl. No.: 330,213

[52] U.S. Cl. .......................... 52/173, 52/64, 52/204
[51] Int. Cl. ...... E06b 1/04, E04f 10/04, E04b 1/343
[58] Field of Search ................ 52/64, 173; 135/5 A; 403/71; 49/475

[56] References Cited
UNITED STATES PATENTS

| | | | |
|---|---|---|---|
| 3,181,274 | 5/1965 | Izenour | 52/64 |
| 3,216,433 | 11/1965 | D'Azzo | 135/5 A |
| 3,528,086 | 9/1970 | Conger | 52/173 |
| 3,538,655 | 11/1970 | Frommelt et al. | 52/173 X |
| 3,557,508 | 1/1971 | Frommelt et al. | 52/173 |

Primary Examiner—Alfred C. Perham
Attorney, Agent, or Firm—Root & O'Keeffe

[57] ABSTRACT

A loading dock shelter embodying a head curtain which is independently, and automatically retractable and extensible.

11 Claims, 5 Drawing Figures

PATENTED JUL 30 1974 3,826,049
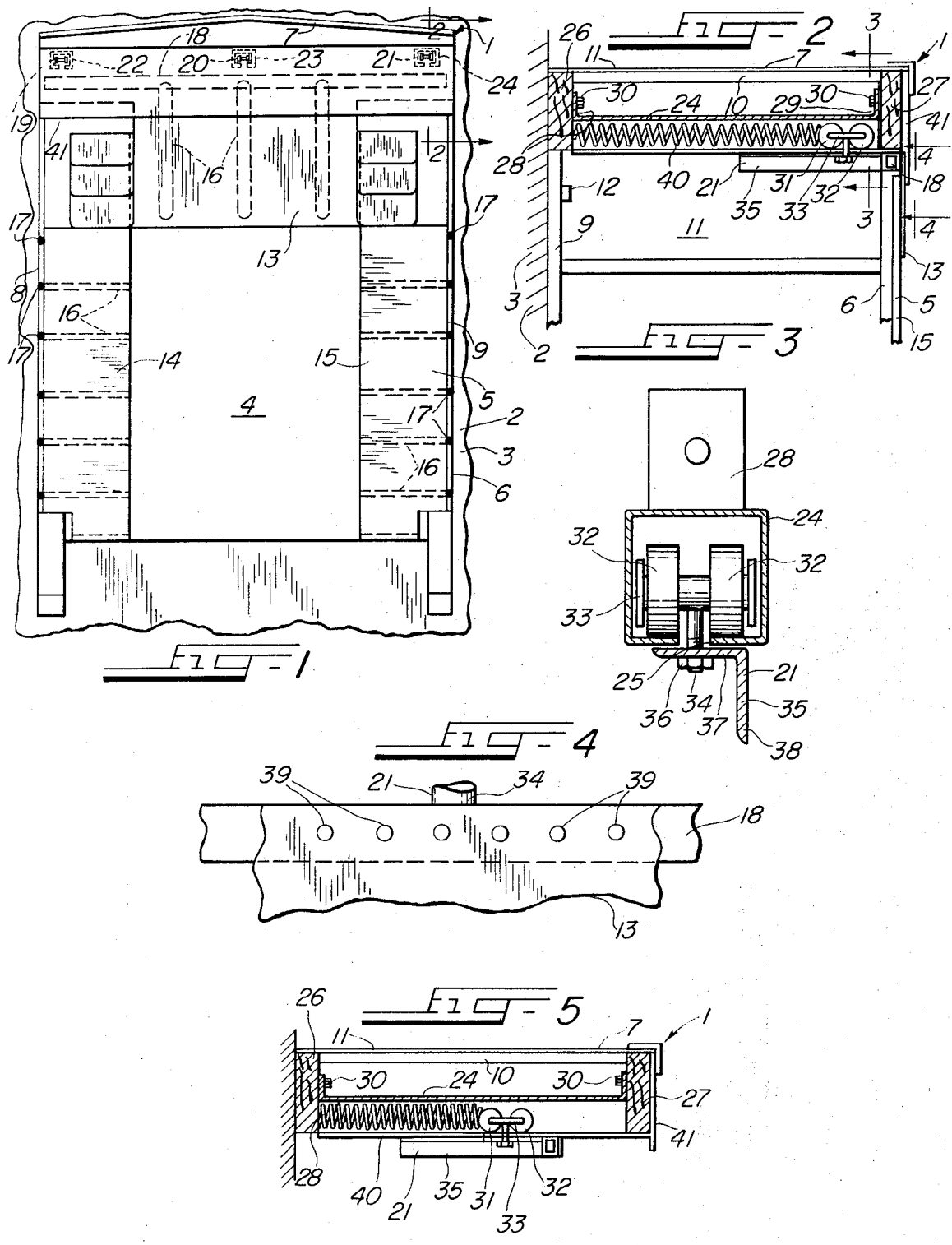

3,826,049

LOADING DOCK SHELTER WITH INDEPENDENTLY MOVABLE HEAD CURTAIN

BACKGROUND OF THE INVENTION

This invention relates to loading dock shelters, and, more particularly, to loading dock shelters of the type embodying head curtains.

A primary object of the present invention is to afford a novel loading dock shelter of the type embodying a head curtain.

Another object of the present invention is to enable the head curtain of a loading dock shelter of the type which embodies a stationary supporting frame projecting outwardly from a warehouse wall, or the like, with side curtains and a head curtain supported by the frame in outwardly disposed position relative to the wall, to be constituted and arranged in a novel and expeditious manner.

An object ancillary to the foregoing is to protect the head curtain of such a loading dock shelter against wear in a novel and expeditious manner.

Loading dock shelters of the type wherein side curtains and a head curtain are supported in outwardly projecting relation to a warehouse wall by means of a stationary frame have been heretofore known in the art, being shown, for example, in our U.S. Pat. Nos. 3,403,489, 3,557,508 and 3,653,173. In the operation of such loading dock shelters, trucks, which are to be loaded or unloaded through warehouse doorways around which such a shelter is disposed, commonly are backed into firm engagement therewith.

As is well known to those skilled in the art, the purpose of thus firmly engaging such a truck with the loading dock shelter is to afford an effective seal between the truck and the loading dock shelter, for protecting from the elements the material and personnel passing into and out of the truck during such loading or unloading operations.

Such engagement of a truck with a loading dock shelter tends to cause wear on the shelter, and, particularly, at the points on the head curtain thereof where the top rear corners of the truck engage the shelter. This is particularly true when the trucks engaging the shelter are of the type, which, in the operation thereof, the trucks commonly are backed into firm sealing engagement with the head curtains and side curtains of such a shelter, and the front end of the truck is then raised upwardly by jacks, or the like, so that the rear top corners of the truck, which are already in firm engagement with the head curtain, are moved even further rearwardly toward the warehouse wall, and, in addition, are moved downwardly, thus producing a highly abrasive, and even tearing force against the head curtain.

The wear and strain placed on head curtains has been well known in the art for a substantial number of years. Various attempts have heretofore been made in the art to protect against such wear. As illustrated in the aforementioned patents, such attempts have included constructing the head curtains of several plies of material; placing reinforcing or protective wear flaps on the head curtains in the areas engaged by the top rear corners of such trucks; or affording expansion pleats between the portions of the head curtain engaged by such trucks and the portions disposed outwardly thereof so as to permit movement of the engaged portions of the head curtains relative to the remainder thereof. Loading dock shelters embodying such constructions heretofore known in the art have been commercially successful, and have met with varying degrees of success relative to the object of eliminating such wear. However, none have been completely successful in the purpose of protecting against such wear, and they commonly have had inherent disadvantages such as, for example, in the case of double thicknesses of material, merely increasing or prolonging the wear resistance of the head curtains; in the case of wear flaps, which overlap and are loose at their lower ends, affording better protection against wear forces applied thereto in one direction then in another; and in the case of pleated head curtains, only affording limited free movement of the truck-engaged portion of the head curtain relative to the remainder thereof. It is an important object of the present invention to enable such disadvantages to be overcome, and to afford a novel loading dock shelter construction wherein the head curtain thereof may be effectively protected against such wear in a novel and expeditious manner.

Another object of the present invention is to afford a novel loading dock shelter of the type wherein a head curtain is supported from a stationary, outwardly projecting frame, or the like, wherein the parts thereof are constituted and arranged in a novel and expeditious manner which permits the head curtain to yieldingly move rearwardly a substantial distance, under such rearward thrust of a truck thereagainst, while maintaining effective sealing engagement between the head curtain and the truck.

Yet another object of the present invention is to enable the head curtain of such a loading dock shelter to move inwardly and outwardly relative to a warehouse wall, or the like, in a novel and expeditious manner, substantially independently of the other portions of the cover of which it forms a part.

A further object of the present invention is to afford a novel carriage and track construction for yieldingly supporting the head curtain on a loading dock shelter in a novel and expeditious manner.

Another object of the present invention is to afford a novel loading dock shelter which is practical and efficient in operation, and which may be readily and economically produced commercially.

Other and further objects of the present invention will be apparent from the following description and claims and are illustrated in the accompanying drawings which, by way of illustration, show the preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a front elevational view of a loading dock shelter embodying the principles of the present invention;

FIG. 2 is a detail sectional view taken substantially along the line 2—2 in FIG. 1;

FIG. 3 is a fragmentary, detail sectional view taken substantially along the line 3—3 in FIG. 2;

FIG. 4 is a fragmentary, detail sectional view taken substantially along the line 4—4 in FIG. 2; and FIG. 5 is a detail sectional view, similar to FIG. 2, but showing certain parts disposed in different operative position.

DESCRIPTION OF THE EMBODIMENT DISCLOSED HEREIN

A loading dock shelter 1, embodying the principles of the present invention is shown in the drawings to illustrate the presently preferred embodiment of the present invention. It is shown mounted on an outer wall 2 of a warehouse 3 in surrounding relation to a doorway 4 in the warehouse wall 2, FIG. 1.

The loading dock shelter 1 is of the same general construction as the loading dock shelters shown in our aforementioned patents, and embodies a front cover 5 mounted on a supporting frame 6 in such position that the front cover 5 is disposed outwardly of the wall 2 of the warehouse 3 in position to be operatively engaged by a truck.

The supporting frame 6 includes an elongated top wall 7, and two sidewalls 8 and 9 projecting downwardly from respective opposite ends of the top wall 7. Each of the walls 7–9 preferably is made of a single, self-supporting panel of suitable water-impermeable, light-permeable material, such as, for example, a translucent material comprising a composition of a resin reinforced with glass fibers, readily available on the market. The frame 6 may be secured to the warehouse wall 2 by suitable means, such as bolts 12.

The cover 5, which is mounted on the supporting frame 6 in outwardly spaced relation to the warehouse 3, embodies a head curtain or top panel 13 and two side curtains or side panels 14 and 15, FIG. 1. The panels 13–15 may be made of any suitable material, but, preferably, they are made of a water-repellent, wear-resistant material, such as, for example, canvas duck or rubber-impregnated nylon fabric.

Each of the curtains 13–15 is substantially rectangular in shape, and, preferably, embodies a plurality of elongated stays 16, extending transversely thereacross in substantially parallel relation to each other, in a manner similar to that disclosed in our aforementioned patents. The stays 16 may be made of any suitable material, such as, for example, spring steel, and are so disposed in each of the panels 13–15 of the loading dock shelter 1 that they yieldingly urge each of the panels 13–15 to remain in their normal, at-rest position, wherein they are substantially flat and extend across the front of the doorway 4, in substantially parallel relation thereto. In such position, the side curtains 15 and 14 are preferably disposed in uniplanar relation to each other, and the top panel 13 projects substantially vertically downwardly from the upper portion of the doorway 4, forwardly of the side panels 14 and 15 in parallel juxtaposition thereto.

As in the loading dock shelters shown in our aforementioned earlier patents, the outer longitudinal edge portions of the side curtains 14 and 15 are secured to the front faces of the sidewalls 8 and 9 of the supporting frame 6, respectively, by a suitable means such as nails or screws 17. The nails or screws 17 are preferably spaced along the curtains 14 and 15 in such a manner that at least one of them extends through the outer end of each of the stays 16 to thereby afford a firm anchor for the stays 16.

In the loading dock shelter 1 shown herein, the head curtain 13 is mounted on and supported by an elongated bar 18, which is supported by three carriages 19, 20 and 21, which are supported by and movable along three elongated tracks 22, 23 and 24, FIG. 1, as will be discussed in greater detail presently.

Each of the tracks 22–24 is identical in construction, and, as is illustrated in FIGS. 2 and 3 with respect to the track 24, each comprises a tubular member which is substantially square in transverse cross-section and embodies an elongated slot 25 extending along the longitudinal center line of the bottom wall thereof throughout the length of the tubular member. The top wall 7 of the frame 6 embodies a rear cross member 26 and a front cross member 27, FIG. 2, and as illustrated in FIG. 2 with respect to the track 24, each of the track members 22–24 extends between the cross members 26 and 27 in close fitting relationship thereto. As shown in FIG. 2 with respect to the track 24, each of the track members 22–24 includes a rear flange 28 and a front flange 29, and the flanges 28 and 29 may be secured to the cross members 26 and 27, respectively, by suitable means such as screws or bolts 30.

The carriages 19–21, also, are identical in construction, and each embodies the construction shown in FIGS. 2 and 3 with respect to the carriage 21. Thus, each carriage embodies two pairs of axially aligned wheels 31 and 32, respectively, rotatably mounted on respective ends of an elongated supporting frame 33, from the center of which a supporting shaft, in the form of a bolt 34, depends, and with an elongated base member 35 supported from the lower end portion of the supporting shaft 34 by a nut 36.

Each of the carriages 19–21 is mounted in the respective tracks 22–24 with the two pairs of wheels 31 and 32 disposed in radial alignment with each other longitudinally of the respective tracks, and with the supporting shafts 34 extending downwardly through the respective slots 25 to support the base members 35 in closely adjacent, substantially parallel, underlying relation to the bottom of the respective tracks 22, 23 or 24. The base members 35 may be of any suitable construction but preferably are in the form of an elongated steel angle-member having a flat, horizontally disposed top wall 37, through which the supporting shaft 34 extends, and a downwardly depending wall 38. Each of the top walls 37 is disposed in closely adjacent, substantially parallel relation to the bottom wall of the respective tracks 22–24, and preferably projects a substantial distance forwardly and rearwardly from the supporting shafts 34 on which they are mounted, so as to afford effective protection against the carriages 19–21 canting in either a clockwise or counterclockwise direction, as viewed in FIG. 2, relative to the respective tracks 22–24 in which they are mounted.

The tracks 22–24 of the loading dock shelter 1 are disposed in parallel, uniplanar relation to each other, with the tracks 22 and 24 disposed closely adjacent to, but in inwardly spaced relation to the sidewalls 8 and 9 of the frame 6.

The upper end portion of the head curtain 13 extends along the front face of the bar 18 and is secured thereto by suitable means, such as screws or rivets 39, FIG. 4. Preferably, the head curtain 13 is of the same horizontal length as the bar 18 and terminates at its opposite horizontal ends at the corresponding ends of the bar 18.

The side curtains 14 and 15 of the loading dock shelter 1 terminate at their upper ends in downwardly spaced relation to the bar 18, FIGS. 1 and 2, and the head curtain 13 is so supported on the bar 18 that it projects downwardly across the upper portion of the doorway 4 and the upper portion of the side panels 14 and 15, forwardly of the side panels 14 and 15 in parallel juxtaposition thereto, when the curtains 13–15 are disposed in their aforementioned normal position.

Two compression coil springs 40 are mounted in the tracks 22 and 24, respectively, in position to be abuttingly engaged with the supporting frame member 26 and the carriages 19 and 21, respectively, in all positions of the carriages 19 and 21, as illustrated with respect to the carriage 21 in FIGS. 2 and 5.

It will be remembered that the carriages 19–21 are connected together by the bar 18, which is secured to the front end of each base member 35 thereof. Therefore, the springs 40 in the tracks 22 and 24 are at all times effective to yieldingly urge all of the carriages 19–21 forwardly in their respective tracks 22–24, and thus yieldingly urge the bar 18 and the head curtain 13 supported thereby forwardly in the loading dock shelter 1.

If desired, a suitable cover, in the form of a piece of flashing 41, or the like, FIGS. 1 and 2, may be secured to the top wall 7 of the supporting frame 6 in position to extend across the upper portion of the front face thereof, the flashing 41 terminating at its lower edge in upwardly spaced relation to the area on which a truck will engage the loading dock shelter 1, but extending downwardly a sufficient distance to cover the interconnection of the head curtain 13 to the bar 18.

It will be seen that with this construction of our loading dock shelter 1 when the shelter is not in use, the springs 40 in the tracks 22 and 24 are effective to yieldingly hold the carriages 19 and 21 in forwardmost position, wherein they are disposed in engagement with the rear face of the supporting frame 27, to thereby dispose the head curtain 13 in its aforementioned normal at-rest position. Upon the application of predetermined rearward force to the head curtain 13, such as, for example, when a truck is backed into operative engagement therewith, the head curtain 13 may be moved, bodily, rearwardly thereby, the carriages 19–21 moving rearwardly along the tracks 22–24 against the urging of the springs 40. The springs 40, preferably, are of such strength that the urging thereof is effective to hold the head curtain 13 in good sealing engagement with such a truck, operatively engaged therewith. However, also, the strength of the springs 40, preferably, is such that the pressure with which the head curtain 13 is held against such a truck is not sufficient to cause an excessive abrasive force, when the truck moves relative to the head curtain 13.

Also, it will be seen that, with this construction, if, after the truck has been moved into normal sealing engagement with the head curtain 13, and the front end of the truck is then elevated, to thereby cause the top, rear corners of the truck to be moved further rearwardly and downwardly, the head curtain 13 is able to move further rearwardly along the tracks 22–24, and thus prevent excessive pressure being applied thereagainst by the truck. When the truck moves away from the loading dock shelter 1, the springs 40 are effective to move the head curtain 13 forwardly toward the aforementioned normal at-rest position thereof.

From the foregoing it will be seen that the present invention affords a novel loading dock shelter.

Also, it will be seen that the present invention affords a novel loading dock shelter wherein the head curtain thereof is protected, in a novel and expeditious manner, against excessive pressure and excessive abrasion being applied thereto by trucks, or the like, operatively engaged therewith.

In addition, it will be seen that the present invention affords a novel loading dock shelter which is practical and efficient in operation, and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A loading dock shelter comprising
  a. a front cover,
  b. means for supporting said cover in position to extend along the top and sides of a doorway in a warehouse wall in outwardly projecting relation to said wall,
  c. said cover including a top panel mounted on said supporting means in position to extend across the upper portion of said doorway in position to engage the top of a truck backed into operative position relative to said doorway for loading and unloading thereof, and
  d. said supporting means including means operatively connected to said top panel for
    1. supporting said top panel independently of the remainder of said cover, and
    2. permitting said top panel to move, as a unit inwardly and outwardly relative to said wall.
2. A loading dock shelter comprising
  a. a front cover
  b. said cover comprising
    1. a top panel, and
    2. two side panels,
  c. means for supporting said side panels outwardly of said wall in position to extend downwardly along respective sides of said doorway and horizontally across said doorway toward the other of said side panels in position to engage the sides of a truck backed into operative position relative to said doorway for loading and unloading thereof, and
  d. other means for supporting said top panel outwardly of said wall in position to extend across the upper portion of said doorway in position to engage the top of said truck when the latter is disposed in said operative position,
  e. said other means being movable independently of said first mentioned means for permitting said top panel to move inwardly and outwardly relative to said wall.
3. A loading dock shelter as defined in claim 2, and in which
  a. said other means are supported by said first mentioned means.
4. A loading dock shelter comprising
  a. a front cover
  b. said cover comprising
    1. a top panel, and

2. two side panels,
c. means for supporting said side panels outwardly of said wall in position to extend downwardly along respective sides of said doorway and horizontally across said doorway toward the other of said side panels in position to engage the sides of a truck backed into operative position relative to said doorway for loading and unloading thereof, and
d. other means for supporting said top panel outwardly of said wall in position to extend across the upper portion of said doorway in position to engage the top of said truck when the latter is disposed in said operative position,
e. said other means being movable independently of said first mentioned means for permitting said top panel to move inwardly and outwardly relative to said wall,
f. said other means comprising
  1. elongated tracks projecting outwardly from said wall, and
  2. carriages supportingly connected to said top panel and supported by said tracks for movement along the latter inwardly and outwardly relative to said wall.

5. A loading dock shelter as defined in claim 4, and in which
a. said tracks are supported from said first mentioned means.

6. A loading dock shelter comprising
a. a front cover, and
b. means for supporting said cover in position to extend along the top and sides of a doorway in a warehouse wall in outwardly projecting relation to said wall,
c. said cover comprising
  1. a flexible top panel, and
  2. two flexible side panels,
d. said supporting means comprising
  1. means for supporting said side panels in position to extend along respective sides of said doorway and horizontally across said doorway toward the other of said side panels in position to sealingly engage the sides of a truck backed into operative position relative to said doorway for loading and unloading of said truck, and
  2. means for supporting said top panel on the side of said side panels remote from said wall in position to extend across the upper portion of said doorway in position to engage the top of said truck when the latter is disposed in said operative position,
e. said third mentioned means comprising
  1. elongated means extending longitudinally outwardly from said wall, and
  2. other means mounted on and carried by said elongated means for movement therealong,
f. said other means being supportingly connected to said top panel.

7. A loading dock shelter comprising
a. a front cover and
b. means for supporting said cover in position to extend along the top and sides of a doorway in a warehouse wall in outwardly projecting relation to said wall,
c. said cover comprising
  1. a flexible top panel, and
  2. two flexible side panels,
d. said supporting means comprising
  1. means for supporting said side panels in position to extend along respective sides of said doorway and horizontally across said doorway toward the other of said side panels in position to sealingly engage the sides of a truck backed into operative position relative to said doorway for loading and unloading of said truck, and
  2. means for supporting said top panel on the side of said side panels remote from said wall in position to extend across the upper portion of said doorway in position to engage the top of said truck when the latter is disposed in said operative position,
e. said third mentioned means comprising
  1. elongated means extending longitudinally outwardly from said wall, and
  2. other means mounted on and carried by said elongated means for movement therealong,
f. said other means being supportingly connected to said top panel,
g. said elongated means comprising track means projecting outwardly from said wall,
h. said other means comprising carriage means mounted on said track means for reciprocation therealong,
i. said top panel being supported by said carriage means for movement therewith, and
j. said third mentioned means including spring means for yieldingly urging said carriage means outwardly away from said wall along said track means.

8. A loading dock shelter comprising
a. a front cover, and
b. means for supporting said cover in position to extend along the top and sides of a doorway in a warehouse wall in outwardly projecting relation to said wall,
c. said cover comprising
  1. a flexible top panel, and
  2. two flexible side panels,
d. said supporting means comprising
  1. means for supporting said side panels in position to extend along respective sides of said doorway and horizontally across said doorway toward the other of said side panels in position to sealingly engage the sides of a truck backed into operative position relative to said doorway for loading and unloading of said truck, and
e. said third mentioned means comprising
  1. elongated means extending longitudinally outwardly from said wall, and
  2. other means mounted on and carried by said elongated means for movement therealong,
f. said other means being supportingly connected to said top panel,
g. said second mentioned means comprising a frame extending along the top and sides of said doorway and projecting outwardly from said wall,
h. said elongated means comprising elongated spaced tracks supported by said frame and extending outwardly from said wall in substantially parallel relation to each other, and
i. said other means comprising carriages
  1. mounted on respective ones of said tracks for reciprocation therealong, and 2. operatively connected to spaced portions of said top panel for supporting said top panel for reciprocation with said carriages.

9. A loading dock shelter as defined in claim 8, and in which
   a. said third mentioned means includes elongated compression springs mounted in said tracks between said wall and said carriages and operatively engaged with said carriages mounted on said respective ones of said tracks for yieldingly urging said carriages outwardly along said track away from said wall.

10. A loading dock shelter as defined in claim 9, and in which
    a. said tracks comprise elongated tubular members having longitudinally extending openings in the bottom thereof,
    b. said carriages comprise
       1. wheels mounted in said tracks for rotation therealong, and
       2. means carried by said wheels and projecting downwardly therefrom through said openings into supporting relation to the upper edge portion of said top panel, and
    c. said means carried by said wheels are movable along said openings during such reciprocation of said carriages along said respective tracks.

11. A loading dock shelter as defined in claim 10, and in which
    a. said carriages include elongated members
       1. mounted on and supported by said means carried by said wheels for movement therewith,
       2. disposed in underlying, substantially parallel relation to respective ones of said tracks, and
       3. having one end operatively connected to the upper edge portion of said top panel for supporting said top panel.

* * * * *